United States Patent [19]
Brekken et al.

[11] 3,958,064
[45] May 18, 1976

[54] MAGNETIC RECORDING TAPE
[75] Inventors: Roger A. Brekken, Hastings; Edgar L. Evans, Woodbury; George F. Olson, Oakdale, all of Minn.
[73] Assignee: Minnesota Mining and Manufacturing Company, St. Paul, Minn.
[22] Filed: Jan. 17, 1972
[21] Appl. No.: 218,498

Related U.S. Application Data
[63] Continuation-in-part of Ser. No. 155,353, June 21, 1971, abandoned.

[52] U.S. Cl................ 428/336; 428/458; 428/900
[51] Int. Cl.$^2$.......................... H01F 10/00
[58] Field of Search ........ 117/7, 138.8 F, 235–240; 156/244; 428/336, 458, 900

[56] References Cited
UNITED STATES PATENTS

| | | | |
|---|---|---|---|
| 2,901,770 | 1/1959 | Beck.................................. | 156/244 |
| 3,187,982 | 6/1965 | Underwood et al................ | 264/95 X |
| 3,359,344 | 12/1967 | Fukushima......................... | 260/873 X |
| 3,515,626 | 6/1970 | Duffield............................. | 117/100 X |
| 3,579,609 | 5/1971 | Sevenich............................ | 264/289 X |
| 3,585,255 | 6/1971 | Sevenich............................ | 260/873 |
| 3,652,716 | 3/1972 | Holub et al........................ | 260/873 X |

FOREIGN PATENTS OR APPLICATIONS
1,539,880  8/1968  France

Primary Examiner—Bernard D. Pianalto
Attorney, Agent, or Firm—Alexander, Sell, Steldt & Delahunt

[57] ABSTRACT

Magnetic recording tape having a backing of biaxially oriented polyethylene terephthalate film containing small amounts of at least two types of structurally dissimilar minute polymeric particles. One type of particle is selected from the class consisting of polypropylene, styrene-acrylonitrile polymer, nylon and incompatible polyesters and the other from the class consisting of polymers of lower olefins. The tape, which has a microscopically irregular, scratch-resistant back free from large protruding particles, is especially adapted for use in instruments and computers, where the resultant dropout incidence is extraordinarily low. A further refinement employs as a backing a two-layer co-extruded film, the back layer containing the polymeric particles and the face layer containing no particulate matter and hence being extremely smooth. When the smooth surface of the face layer of such a thin two-layer film is metallized, a mirror-like appearance results; the film can, however, still be handled in roll form.

6 Claims, No Drawings

MAGNETIC RECORDING TAPE

CROSS-REFERENCES TO OTHER APPLICATIONS

This application is a continuation-in-part of our copending application Ser. No. 155,353 filed June 21, 1971 and now abandoned.

BACKGROUND OF THE INVENTION

This invention relates to magnetic recording tape, especially tape for stringent requirement computer and instrumentation applications, and to modified biaxially oriented polyethylene terephthalate film backing having particular utility for use in such tape.

Magnetic recording tape used in computers is subjected to unusually severe operating conditions. It may be wound from one reel to another at 1500 ft. per minute, starting, stopping and reversing abruptly, and hence must be physically strong. Virtually all recording tape transports are so arranged that the back of the tape passes over stationary metallic guides and other wear-inducing supports, the resultant frictional heat tending to soften the polyester backing, generate dust, and dislodge the calcium acetate or other inorganic slip agent which is present in conventional tape. Polyester dust and similar debris adhere to the backing because of static electricity and, despite great care, tend to become embedded in the relatively soft and magnetic coating when the tape is wound under tension on a reel.

Information, which may be recorded in 7 tracks (channels) on ½-inch wide tape at the level of 1600 "bits" per inch, is read from the tape as the magnetic coating passes over and closely adjacent to a reading head. When tape which has had debris embedded in the coating is next used, the debris causes the magnetic coating to be spaced from the head which performs the reading function. When this occurs, there is a "dropout", in which one or more bits of information is not conveyed to the head. In especially severe cases, the debris may actually transfer to the head and cause complete loss of the recorded signal. Although an occasional dropout might be permissible in audio tape, or even in video tape, it is completely intolerable in computer tape.

Even though inorganic slip agents clump together, form large irregular abrasive aggregates perhaps 20 microns in diameter, and promote scratching of adjacent layers of film, they are included in almost all polyester film to permit handling the film before it is converted. Polyester films from which such slip agents are eliminated are indeed smoother and hence less prone to cause scratching, but adjacent layers block and do not slide over each other readily. Nor is magnetic recording tape made on such film free from abrasion, since it is still susceptible to damage by rough spots on the guide plates over which it passes.

Recognizing the problem set out above, the art has attempted to solve it in various ways. One approach has been to utilize wiping systems in which the back of the tape is contacted by a porous fabric which is intended to remove dust and debris. Although helpful, wiping fabrics not only fail to remove all debris but also, in some instances, collect and hold abrasive detritus such as inorganic skip agent, thereby actually accentuating and propagating tape backing wear and defeating the purpose for which they are nominally employed.

Another approach to the problem of reducing wear has been to apply a carbon black-containing wear-reducing coating to the back of the tape, but such a coating requires an extra manufacturing step, increases cost and may wear during use. Any material which is worn off the backing must be cleared away to prevent its depositing throughout the system. A similar approach has been to apply silicone lubricants either in or over the magnetic layer; the same cost, wear and cleaning problems arise, and the silicone is not always effective in preventing backing wear.

It has been known for some time that finely divided polymeric additives could be blended into a polyester melt prior to its extrusion as a film and subsequent orientation. For example, U.S. Pat. No. 3,515,626 discloses mixing up to 25% of fine nylon 66 particles with polyester chips, coextruding a three-layer film having a nylon-filed polyester layer at each face and a clear polyester center layer, and biaxially orienting the composite film to achieve a product having a surface which is irregular enough to accept pencil and ink markings. U.S. Pat. No. 3,579,609 discloses the improvement in flex life which results from incorporating minor amounts of polymers of lower olefins or tetramethylene oxide into polyester film formulations, also suggesting that such additives improve the "slip" properties of the film; nylon is suggested as a further additive to improve heat resistance. Magnetic recording tape made on backings containing as little as ¼% olefin polymer additive is said to possess improved resistance to scratching, seizing or blocking. U.S. Pat. No. 3,585,255 teaches the incorporation of polystyrene, polyionomer, or poly(4-methyl pentene) in polyester film to improve slip and electrical properties. French Pat. No. 1,539,880 broadly mentions including 0.01 to 12% of one or more thermoplastic addition polymers in polyethylene terephthalate resin which is to be extruded as a film and biaxially oriented. The resultant film is said to have utility for a variety of purposes, including as a backing for magnetic recording tape.

SUMMARY

The present invention provides an extremely high quality magnetic recording tape which can be used in computers and instruments, where it will resist severe usage for long periods of time with maximum surface uniformity and minimum wear, consequently resulting in extremely low dropout incidence. The tape, which requires no special coating or treatment, utilizes the unexpected discovery that specific modified polyester films, within an area disclosed by the prior art, impart outstandingly superior performance to magnetic tapes in which they are used as backings.

In accordance with the invention, magnetic recording tape is made by coating over one face of a backing a layer of magnetizable particles in a binder therefor, the backing comprising a conventionally biaxially oriented and heat set flexible polymeric film having (1) a continuous phase consisting essentially of from 92% to 98% by weight polyethylene terephthalate and (2) a plurality of structurally dissimilar and mutually insoluble discontinuous phases consisting of a total of from 8% to 2% by weight of finely divided discrete fusible polymer particles. In a particularly preferred form of the invention, the backing is a 2-layer coextruded structure in which the back layer has the polyphase composition just described and the face layer (i.e., the layer adjoining the surface to which the magnetic coating is to be applied) is free from particulate matter and hence is extremely smooth. A thinner magnetic coating layer can be successfully applied to the smooth surface than to the relatively rough surface of conventional film (or the surface of the polyphase layer), thereby reducing the cost of the finished tape. Such thinner tapes are particularly useful for recording high frequencies (e.g., in instrumentation tape or video cassettes), a greater length of tape being provided in a given size of tape package.

Based on the total weight of the polyphase layer, the discontinuous phases consist essentially of (A) 1% to 6% discrete particles of at least one polymer selected from the class consisting of polypropylene, styrene-acrylonitrile polymer, nylon and incompatible polyesters and (B) 1% to 6% discrete particles of at least one polymer selected from the class consisting of polymers of lower mono-alpha-olefins, any polymer selected under class (B) being structurally different from any polymer selected under class (A). For examaple, if isotactic polypropylene is used as a class (A) polymer, it cannot also be used as a class (B) polymer, it being necessary to use a structurally different lower olefin polymer for that purpose. Typical incompatible polyesters, all of which are characterized by

linking groups, include polycarbonates (e.g., the polymerized reaction product of bisphenol A and phosgene), copolyesters (e.g., the polymerized reaction product of one mol each of terephthalic acid and isophthalic acid with two mols of 1,4-cyclohexylene dimethanol), and polyurethanes (e.g., the reaction product of 1,4 cyclohexandiol and methylene bis 4 phenyl isocyanate). The term "incompatible" means essentially insoluble in polyethylene terephthalate under the processing conditions set forth herein. Suitable polymers of lower alpha-olefins include branched (low density) polyethylene, linear (high density) polyethylene, polybutylene, ethylene: propylene copolymers, etc. Film backings of this composition are more resistant to scratching than polyester films which are identical except for containing only additive polymer from either class (A) or class (B), polyester film containing less than 1% or more than 6% of either class (A) or class (B) polymers, 1% to 6% of other polymeric additives or conventional polyester film.

It is frankly not understood why films containing a combination of both class (A) and class (B) polymer additives in the specified quantities are so effective in practicing the invention, but it is felt that the resultant surface condition is important. For example, a composition comprising a polyester resin containing 2% polycarbonate and 2% low density polyethylene lends itself to the preparation of a film displaying a close-packed array of uniform-sized fine convexities when viewed under the electron microscope. In contrast, a film formed in the same manner from a polyester composition containing 2% or 4% of either polycarbonate or low density polyethylene alone appears to have a greater size range of convexities and to be significantly less uniform in appearance. The same inexplicable phenomenon is typically observed i connection with polyester films containing other class (A)-class (B) additive systems compared to polyester films containing only one additive. Surface uniformity alone, however, is insufficient as a criterion for predicting the performance of a polyester film for use as a magnetic tape backing, as will now be discussed in more detail.

The suitablility of biaxially oriented films made in accordance with the invention for use as the backing of computer and instrumentation tape is determined by subjecting them to various measurements and tests, which are set forth in succeeding paragraph.

Abrasion resistance. A 36-inch × ½ inch continuous loop of either uncoated film or magnetic recording tape is driven at 1,500 feet per minute over a series of roller guides, the back or uncoated surface contacting a 1-inch long path over a stationary square bar which has been wrapped with a standard commercially available wiping fabric. This fabric, which is commonly used in computers for cleaning the backs of magnetic tapes to remove detritus, is a substantially nonabrasive nonwoven product containing equal parts of unplasticized cellulose acetate and viscose fibers, randomly held together with a polyethyl acrylate copolymer. A load of 17.92 ounces is applied to the tape during the test, which is continued for 90 seconds. Both the wiping fabric and the back of the film are then visually examined, in order to arrive at the following ratings:

Debris Rating. To pass this test the film must have a rating of at least 3 based on examination of the wiping fabric, using the following scale:
   0—Complete heavy coverage of 1 inch × ½ inch contact area with white debris (fibers and dust from the film backing)
   1—Light dust covering 75% of the fabric or heavy dust covering 50% of the fabric
   2—Light dust covering less than 50% of the fabric
   3—Light dust covering less than 25% of the fabric
   4—No visible dust or debris Scratch Rating. The scratched surface of the film is vapor coated with about 1000 Angstroms of aluminum and photographed under 5X magnification. A rating of at least 3 must be obtained on the following rating scale:
   0—Severe gouging and furrowing
   1—Many broad ( $\geq$ 10 mils on the film) scratches and some gouging or furrowing
   2—Fine scratches and a few broad scratches
   3—Many very fine (about 0.001 inch) scratches
   4—No more than a few very fine scratches Roughness. This is a pass-or-fail test in which the surface of the backing which is to receive the magnetic coating must have a peak-to-valley roughness range not exceeding about 10 micro-inches and preferably less than 6 micro-inches as measured on the Bendix "Proficorder" profilometer using a 0.1 mil diamond stylus. The average roughness should not exceed 3 micro-inches, and is preferably less than 2 micro-inches.

The preferred method of making biaxially oriented films in accordance with the present invention is to "tap" the barrel or feed zone of an extruder used for preparation of polyethylene terephthalate film, attaching a second extruder at this location to permit feeding a melt consisting essentially of two or more additive polymers into the barrel. Pellets of the additive polymers can be dry blended and then fed into the hopper of the second extruder; alternatively, a blend of the additive polymers may be extruded and pelletized to form a masterbatch for subsequent use. No matter which technique is followed, however, each of the additive polymers employed forms a separate discontinuous phase in the polyester resin. After the blended polymers are extruded as a film and biaxially oriented, examination under the electron microscope reveals each additive polymer in the form of discrete particles having at least one dimension less than about 0.5 micron and no dimension greater than about 10 microns. The individuality maintained by the various additive polymers is presumed to stem from the fact that, under the conditions of dispersion and extrusion, they are insoluble in, and unreactive with, each other and the polyethylene terephthalate in which they are dispersed.

Through trial and error it has been learned that it is desirable to employ approximately the same weight of class (A) polymer as class (B) polymer, although a weight ratio in the 2:1 to 1:2 range is quite satisfactory. At extremes beyond 5:1 or 1:5, however, the surface of the biaxially oriented film is unexplainably rougher and exceeds the 10 micro-inch range which is considered satisfactory for single-layer films. It has likewise been found that if the amount of either class (A)polymer phase or class (B) polymer phase falls below 1% by weight of the total film (or in the case of coextruded film, the polyphase layer), the desired degree of scratch resistance is not obtained. If the total amount of polymer present in the discontinuous phases substantially exceeds one-third the volume of the total film, the tensile strength is jeopardized and surface smoothness is extremely difficult to maintain. All factors considered, it has been found particularly desirable for the polyphase layer to contain (based on its total weight) about 2% class (A) polymer and 2% class (B) polymer, a particularly preferred embodiment incorporating 2% polycarbonate and 2% polyethylene.

The shearing and mixing action at elevated temperatures encountered during extrusion is predominantly responsible for the ultimate particle size of the additive polymers and the dispersion thereof in the matrix of the polyester film. Higher shear rates contribute to finer particle size, improved dispersion, and hence a smoother surface of the film.

The ease of blending various types of additive polymer and incorporating them in polyethylene terephthalate is, as might be expected, related to the specific polymers involved. Nylon and other extremely high molecular weight polymers, for example, are relatively tough and high melting; accordingly, additional heat and/or mechanical shearing action is required to disperse such polymers effectively and to subdivide them into sufficiently small particles to obtain the desired degree of surface smoothness.

DESCRIPTION OF PRESENTLY PREFERRED EMBODIMENTS

Set forth below are tabulated examples, showing the performance of magnetic recording tape prepared in accordance with the invention. In each case the additive polymers were blended, extruded as a melt into the feed zone of an extruder containing polyethylene terephthalate granules, and shear-mixed therein. The polyethylene terephthalate, containing the additive polymers as discontinuous dispersed phases, was then extruded at 550°–580°F. under moderate head pressure, oriented approximately 3.5X in both the length and cross directions to a thickness of 0.0015 inch, heat set at about 450°F. and tested, as indicated hereinabove.

For the magnetizable coatings, 700 parts by weight of acicular gamma-$Fe_2O_3$ particles, 57 parts of a conductive carbon black, 42 parts of wetting agent, 350 parts of toluene and 230 parts of methyl ethyl ketone were placed in a porcelain ball mill with ½-inch steel balls. The paste obtained after milling for 30 hours was modified by adding a mixture of 930 parts of a solution of a polyester urethane polymer, 7 parts of lubricant and 2 parts of silicone and additionally milling for 2 hours. The polyesterurethane solution consisted of 186 parts of the polymer, 558 parts of methyl ketone and 186 parts of toluene. This dispersion was further modified by diluting with equal parts of toluene and methyl ethyl ketone in 150-gram increments until a usable coating consistency was obtained. Milling was continued for one hour between successive additions. The final dispersion was transferred and subjected to high shear mixing for 30 minutes, passed through a filter (5-micron openings) and coated on each of the films. Each coated film was passed immediately through a unidirectional magnetic field of 1500 oersteds to physically align the acidular particles in the longitudinal direction of the film backing following by drying in the oven to provide a dried coating thickness of approximately 400 micro-inches. The surface of the dried coating was polished, and the tape was slit to one-half inch in width.

TABLE I

| Example | Additive Polymers Class (A) Polymer | Wt % | Class (B) Polymer | Wt. % | Debris Rating | Scratch Rating | Roughness, micro-inches Average | Range |
|---|---|---|---|---|---|---|---|---|
| Control | Calcium acetate | 1 | — | — | 0 | 0 | 2.0 | 10 |
| 1 | Polypropylene[1] | 1.4 | Polybutene[2] | 1.4 | 3 | 3 | 3.0 | 10 |
| 2 | " | 1.4 | Polyethylene[3] | 1.4 | 4 | 3 | 1.8 | 5 |
| 3 | " | 1.9 | Polyethylene[4] | 1.9 | 4 | 4 | 1.7 | 7 |
| 4 | Nylon[5] | 1.0 | Polypropylene[1] | 1.0 | 4 | 4 | 1.0 | 3 |
| 5 | Polycarbonate[6] | 1.4 | " | 1.4 | 4 | 4 | 0.8 | 4 |
| 6 | (Nylon[5] | 1.25) | " | 1.25 | 3 | 3 | 1.3 | 4 |
|   | (Polycarbonate[6] | 1.25) |   |   |   |   |   |   |
| 7 | Styrene:acrylonitrile polymer[7] | 1.9 | Polyethylene[3] | 1.9 | 4 | 4 | 2.2 | 7 |
| 8 | Polycarbonate[6] | 2 | Polyethylene[4] | 2 | 4 | 3 | 1.3 | 3 |
| 9 | " | 4 | " | 2 | 3 | 4 | 1.8 | 4 |
| 10 | " | 2 | " | 4 | 3 | 4 | 1.5 | 3 |
| 11 | " | 4 | " | 4 | 4 | 4 | 1.5 | 5 |
| 12 | " | 2 | Polyethylene[8] | 2 | 3 | 4 | 1.8 | 8 |
| 13 | " | 4 | " | 2 | 3 | 4 | 2.0 | 6 |
| 14 | " | 2 | " | 4 | 4 | 4 | 3.0 | 10 |
| 15 | " | 4 | " | 4 | 4 | 4 | 2.3 | 6 |

TABLE I-continued

| Example | Additive Polymers Class (A) Polymer | Wt % | Class (B) Polymer | Wt. % | Debris Rating | Scratch Rating | Roughness, micro-inches Average | Range |
|---|---|---|---|---|---|---|---|---|
| 16 | Copolyester[9] | 1 | Polyethylene[3] | 1 | 3 | 4 | 2.5 | 10 |

[1]Isotactic polypropylene, having a density of 0.906 and an average melt flow of 15, commercially available as "Pro-fax" 6323 from Hercules Powder Co.
[2]Polybutylene, having a density of 0.91 and an average melt index of 1.8, commercially available as "PB 101" from Mobil Chemical Co.
[3]Branched polyethylene, having a density of 0.918 and an average melt index of 3.5, commercially available as "Bakelite" DFD 3300 from Union Carbide Corp.
[4]Linear polyethylene having a density of 0.956 and an average melt index of 11, commercially available as "Hi-fax" HDPE-B-56-110 from Hercules Powder Co.
[5]Alcohol-soluble nylon 6, commercially available as "Zytel" 101 from E. I. duPont de Nemours & Co.
[6]Linear aromatic polyester of carbonic acid, having the repeating group density of 1.20 and a heat distortion temperataure of

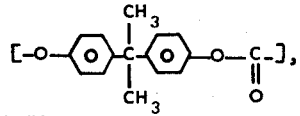

280°-290°F., commercially available as "Merlon" M-50-1000 from Mobay Chemical Co.
[7]Commercially available as Dow Styrene-Acrylonitrile, Type 867 from Dow Chemical Co.
[8]Branched polyethylene, having a density of 0.928, and an average melt index of 1-1.2, commercially available as "Bakelite" DHDA 4080 from Union Carbide Corp.
[9]Copolyester made by copolymerizing equal mols of terephthalic acid and isophthalic with 1,4 cyclohexylene dimethanol, commercially available as "Tenite" Polyterephthalate 7 DRO from Eastman Kodak Co. containing 30 parts by weight of lampblack per 70 parts by weight of copolyester.

To demonstrate the relationship between performance on the tests described above and the actual performance of magnetic recording tape, two lots of magnetic recording tape were prepared, identical except for the specific film backing employed, using the coating composition and procedure previously described hereinabove. In one case, the film backing was the control shown in Table I and in the other case the film backing was that of Example 12, also as shown in Table I. The resultant magnetic recording tapes were slit to a width of one-half inch, cut to a length of 2,400 feet, and wound upon reels.

Ten reels of each lot of tape were recorded at 800 bits per inch with computer data and tested on a commercial Burroughs Model MTT-9392 computer. In this test the tape was unwound from one reel, passed through the computer at 120 inches per second, and wound on a second reel. After all the tape had been wound on the second reel, the direction of travel was reversed. This process was carried out for 10 passes. Throughout the test, the tape was passed over writing and reading heads, and the number of dropouts was measured. (In this test the machine "writes", or records, each pass and reads what has been recorded during the same pass.) At the conclusion of the test, it was observed that the control tape had experienced from 15 to 150 "temporary write" errors per pass and from 6 to 8 "permanent write" errors per pass. In dramatic contrast, the tape of Example 12 had experienced an average of only 0.19 temporary write error per pass and 0.18 permanent write error per pass.

In another comparative test on commerical equipment, additional rolls of magnetic tape made on the control and Example 12 backings were passed through an RCA computer and the amount of "shedding" (i.e., backing debris deposited on tape transport equipment) observed as the tape was unwound through the equipment and thereafter rewound. It was observed that the tape made on the control backing displayed an amount of shedding after 500 passes equivalent to the amount of shedding displayed by the tape made on the Example 12 backing after 2,500 passes.

When tape made on the Example 12 backing and tape made on the control backing were tested on medium band instrumentation equipment, the Example 12 product was significantly better.

In order to demonstrate the effect obtained when a polymeric additive from only class (A) or class (B) is employed, the following table is submitted, superscript numbers referring to the footnotes following Table I:

TABLE II

| Additive Polymers Class (A) Polymer | Wt % | Class (B) Polymer | Wt % | Debris Rating | Scratch Rating | Roughness, micro-inches Average | Range |
|---|---|---|---|---|---|---|---|
| Polycarbonate[6] | 2 | — | — | 1 | 1 | 1.8 | 6 |
| " | 4 | — | — | 1 | 1 | 2.3 | 7 |
| " | 6 | — | — | 0 | 0 | 3.5 | 12 |
| Nylon[5] | 2 | — | — | 0 | 0 | 1.3 | 2 |
| " | 4 | — | — | 0 | 0 | 1.5 | 5 |
| Polypropylene[1] | 2 | — | — | 0 | 0 | 2.5 | 5 |
| " | 4 | — | — | 0 | 0 | 2.5 | 6 |
| styrene-acrylonitrile polymer[7] | 1.4 | — | — | 2 | 1 | 1.2 | 4.5 |
| — | — | Polyethylene[8] | 2 | 2 | 3 | 3.5 | 10 |
| — | — | " | 4 | 3 | 4 | 5.0 | 17 |
| — | — | Polyethylene[4] | 2 | 2 | 2 | 1.0 | 4 |
| — | — | " | 4 | 3 | 2 | 2.0 | 5 |
| — | — | Polybutene[2] | 2 | 0 | 2 | 2.5 | 5 |
| — | — | " | 4 | 2 | 2 | 5.0 | 19 |

To obtain a film backing which in some ways is superior even to those which have been heretofore described in connection with the invention, a two-layer film can be prepared by juxtaposing two extruders, each feeding a different polyester-based composition into a specially designed die to form a stratified cast product, which is thereafter biaxially oriented. (Coextrusion processes of this type are broadly old; see, e.g., Modern Plastics, April, 1968, page 130 and June, 1968, page 78; see also U.S. Pat. No. 2,901,770, 3,187,982, 3,266,093, 3,513,626 and others). In utilizing coextrustion processes to practice the present invention, one polyester-based composition is essentially completely free from any organic or inorganic particulate material; the other polyester-based composition is a polyphase formulation of the type described previously, e.g., as illustrated in Table I.

Two-layer films of this type have one extremely smooth surface, over which the desired coating is applied, and one relatively irregular surface, which provides the degree of scratch-resistant slip required to handle the composite film easily. In preparing such composite films, the two layers should be controlled so that the thickness of the particle-free layer meets at least one of the following criteria:

a. at least 0.15 mil,
b. at least 50% of the combined thickness of the two layers.

The reason for these criteria is that, as previously noted, it is desired to have one surface as smooth as possible and the other surface sufficiently irregular to prevent blocking, seizing and scratching when the composite film is wound convolutely upon itself in roll form during or after the manufacturing process. For maximum smoothness, of course, the thickness of the particle-free layer should be great enough to prevent "print-through", or transfer of the irregularities in the particle-containing layer to the smooth surface. On the other hand, it appears that the polyphase particle-containing layer should be at least 0.05 mil thick to provide adequate slip characteristics.

Because the polyphase layer of a 2-layer construction does not receive the magnetic coating, the degree of acceptable roughness for the surface of the polyphase layer may exceed that which can be tolerated for the surface of a one-layer polyphase construction. Thus, for example, the polyphase layer of a 2-layer film may contain (in addition to the class A and class B polymer additives) minor amounts of other finely divided polymeric or inorganic filler particles, e.g., polysulfone, carbon black, silica, titania or diatomaceous earth. Inclusion of such additional particles improves the winding characteristics of the 2-layer film and magnetic tape with such film as a backing, the reason being tentatively attributed to preventing the formation of a cushion of trapped air between adjacent convolutions. The total volume occupied by the various discontinuous phases should be held to a minimum so as to maintain the strength of the film as high as possible. As a rule of thumb, the cumulative volume of the discontinuous phases should not exceed about one-third the volume of the polyphase layer in which they appear.

EXAMPLES 17–21

Using conventional coextrusion techniques and the procedure outlined hereinabove, five 2-layer film structures were prepared and biaxially oriented. Each of the composite films included one smooth-surfaced (face) layer of particle-free polyethylene terephthalate and one relatively rough-surfaced (back) layer of polyethylene terephthalate free from inorganic slip agent but containing one class A and one class B organic slip agent.

Two and one-half inch wide strips of the four films were tested in accordance with the procedure generally set forth in ASTM Test No. D1894, Procedure A, to obtain the statis and kinetic coefficients of friction for back-to-back, back-to-face and face-to-face arrangement. Results are set forth in Table III below, superscript numbers again referring to the footnotes following Table I:

TABLE III

| Example | Thickness, mils Smooth layer | Thickness, mils Particle containing layers | Additive polymers in particle-containing layer Class A Polymer Type | Class A Polymer Wt % | Class B Polymer Type | Class B Polymer Wt % | Debris Rating | Scratch Rating |
|---|---|---|---|---|---|---|---|---|
| 17 | 1.00 | 0.43 | Nylon[5] | 2.75 | Polyethylene[3] | 2.75 | 4 | 4 |
| 18 | 1.00 | 0.43 | Polycarbonate[6] | 2.75 | " | 2.75 | 4 | 4 |
| 19 | 0.66 | 0.30 | " | 2.4 | " | 2.4 | 4 | 4 |
| 20 | 0.75 | 0.25 | " | 1.0 | Polypropylene[1] | 1.0 | 4 | 4 |
| 21 | 0.80 | 0.20 | Copolyester[9] | 5.0 | Polyethylene[3] | 5.0 | 3 | 4 |

| Example | Average surface roughness, microinches Back | Average surface roughness, microinches Face | Coefficient of friction Static Back-to-back | Coefficient of friction Static Back-to-face | Coefficient of friction Static Face-to-face | Coefficient of friction Kinetic Back-to-back | Coefficient of friction Kinetic Back-to-face | Coefficient of friction Kinetic Face-to-face |
|---|---|---|---|---|---|---|---|---|
| 17 | 3.5 | >0.5 | | | | 0.45 | 0.45 | <5 |
| 18 | 2.0 | >0.5 | | | | 0.4 | 0.47 | <5 |
| 19 | 1.3 | 0.5 | 0.45 | 0.62 | 3.6 | | | |
| 20 | 1.9 | >0.5 | 0.84 | 0.97 | <5 | 0.97 | 0.98 | <5 |
| 21 | 7 | >0.5 | 0.2 | 0.4 | <5 | 0.15 | 0.37 | <5 |

It will be noted that the coefficient of friction between rough and smooth surfaces is almost as low as between two rough surfaces. From the fact that the coefficient of friction between two smooth (face) surfaces is extremely high, it can be appreciated that it is extremely difficult, if not impossible, to process low-caliper particle-free single-layer films. As a rule of thumb, the back-to-face coefficient of friction should not exceed 1.5. The films of Examples 17–21 could readily be wound into and unwound from large rolls. The film of Example 21 had unusually low back-to-face coefficients of friction, making it particularly attractive as a backing for use in magnetic tape where rapid starting and stopping of the tape is essential.

EXAMPLE 22

The face (smooth surface) of the film of Example 18 was provided with a conventional coating of acicular gamma-$Fe_2O_3$ particles in a suitable binder, all as previously described herein. A control tape, utilizing the same magnetic coating layer as in the tape of this Example 22 and representing what is considered one of the most wear-resistant tape products heretofore commercially available, was also obtained. This control tape utilized a 1.5-mil polyethylene terephthalate backing containing inorganic slip agent and provided, on the back side, with a carbon black-containing wear-resistant coating. Coefficients of friction for the two tapes were then measured, using the procedure previously described, but employing 1-inch wide samples. Results are summarized below:

TABLE IV

| Tape | Coefficient of friction | | | |
|---|---|---|---|---|
| | Static | | Kinetic | |
| | Back-to-back | Back-to-oxide | Back-to-back | Back-to-oxide |
| Control | 1.41 | 0.98 | 0.91 | 0.75 |
| Example 22 | 1.06 | 0.86 | 1.05 | 0.66 |

The tape of Example 22 was at least as easy to handle as the commercial product, without the necessity of separately applying an anti-friction coating. At the same time, the face of the film used in the Example 22 tape is smoother than, and hence can employ a thinner magnetic coating than, the face of the film used in the control tape; thus, greater recording time, per roll or cassette, can be obtained with such tape than with conventional tape.

In order to demonstrate the utility of the two-layer film construction for another application, a portion of the rough surface of the films of Examples 17 and 18 was provided with a thin layer of vapor-deposited aluminum, the smooth reverse face being left free from vapor coating. A portion of the smooth surface of each film was similarly vapor-coated with aluminum, the rough reverse surface being left uncoated. When the metallized film were examined, it was noted that all had a lustrous appearance, but the metallized rough surfaces were both noticeably duller than the metallized smooth surfaces. Indeed, the latter were almost mirror-like. To provide a more quantitative measure of this feature, each of the surfaces was subjected to a specular reflection test, using a Bausch & Lomb "Spectronic" 505 spectrophotometer, where total and diffuse reflection were measured, specular reflection being determined by difference. Results are tabulated below:

TABLE V

| | % Incident Beam Reflectance at 470 Nanometers | | | | | |
|---|---|---|---|---|---|---|
| | Rough Surface | | | Smooth Surface | | |
| Example | Total % | Diffuse % | Specular % | Total % | Diffuse % | Specular % |
| 17 | 80.0 | 16.0 | 64.0 | 84.5 | 7 | 77.5 |
| 18 | 82.5 | 24.5 | 58.0 | 86 | 5 | 81 |

The films of Examples 17 and 18, when metallized on the smooth surface, provide a higher quality reflectance than any which has previously come to applicants' attention. Films of this type should find great utility in the preparation of nonglass mirrors, roll leaf for hot stamp processing, decorative trim, metallic yarn, heat- and light-reflective panels, etc. It should be emphasized that, although small samples of thin, highly reflective metallized polyethylene terephthalate film have been previously prepared, such films before metallizing, because of their very smoothness, could not be handled in roll form; hence their utility was extremely limited. The only previously known way to obtain both excellent specular reflection and ease of handling was to employ films at least 5 mils thick.

Another use for film products made in accordance with the invention lies in the manufacture of transparent-reflective solar control film, where a thin polyester film is metal vapor-coated and subsequently adhered to a window. Such products lose much of their attractiveness if an exposed surface of the substrate is scratched either before or after metallizing. Compared to conventional polyester films, biaxially oriented films of the invention intrinsically acquire fewer scratches during production, require less care in handling before metallizing, and when metallized display a more lustrous reflective appearance which remains even after long periods of use. The quality is still further enhanced when a 2-layer construction (i.e., one particle-containing layer as described above and one smooth particle-free layer) is metal vapor coated on the surface of the particle free layer, as is described in the two immediately preceding paragraphs.

It will also be appreciated that other modifications of the invention can be made without departing from the underlying concepts. To illustrate, the film can be colored by blending small but effective amounts of dyes or sub-micron pigments with the other components. The principles of the invention can, of course, be employed in the manufacture of reverse-oriented film, i.e., film which is first oriented in the cross direction and then in the machine direction, the degree of machine direction orientation exceeding the degree of cross orientation. When made in accordance with the invention, such reverse-oriented films have particular value in the manufacture of extremely thin, magnetic recording tape for both video and audio cassettes, the 2-layer construction being especially useful for this purpose.

We claim:

1. A coated sheet material characterized by outstanding wear resistance, scratch resistance and processability, said sheet material comprising in combination a biaxially oriented flexible polymeric film, having one comparatively smooth face and one comparatively rough face, and having coated over said smooth face thereof a thin layer of material, said film prior to coating having at its opposite surfaces, respectively,
   a. a substantially particle-free smooth-surfaced first layer consisting essentially of polyethylene terephthalate and having a thickness which meets at least one of the following criteria:
      1. at least 0.15 mil
      2. at least 50% of the total film thickness, and b. a particle-containing relatively rough-surfaced second layer consisting essentially of
1. a major continuous phase consisting essentially of polyethylene terephthalate and
2. a plurality of minor discontinuous phases consisting essentially of finely divided particles, not exceeding about 1/3 the total volume of said second layer, at least two of said discontinuous phases being structurally different and mutually insoluble, said polymers consisting essentially of, based on the total weight of said second layer,
a. from 1% to 6% discrete particles of at least one polymer selected from the class consisting of polypropylene, styreneacrylonitrile polymer, nylon and incompatible polyester, and
b. from 1% to 6% discrete particles of at least one polymer selected from the class consisting of polymers of lower mono-alpha-olefins, any polymer so selected being structurally different from any polymer selected under (a).

2. The coated sheet material of claim 1 wherein the coating is magnetic iron oxide in a binder.

3. The coated sheet material of claim 2 wherein the second layer additionally contains finely divided carbon.

4. The coated sheet material of claim 3 wherein the carbon is milled into one of said polymers.

5. The coated sheet material of claim 4 wherein the carbon is milled into an incompatible polyester resin.

6. The coated sheet material of claim 1 wherein the coating is a vapor-deposited metal.

* * * * *

UNITED STATES PATENT AND TRADEMARK OFFICE
CERTIFICATE OF CORRECTION

PATENT NO. : 3,958,064
DATED : May 18, 1976
INVENTOR(S) : ROGER A. BREKKEN, EDGAR L. EVANS and GEORGE F. OLSON It is certified that error appears in the above-identified patent and that said Letters Patent are hereby corrected as shown below:

Col. 1, line 52, "magmetic" should read --magnetic--.

Col. 2, line 15, "nylon-filed" should read --nylon-filled--.

Col. 3, line 17, "examaple" should read --example--.

Col. 3, line 64, "i" should read --in--.

Col. 7, Table I, line 15, "density of 1.20 and a heat distortion temperature of" should appear after the chemical formula.

Col. 9 and 10, lines 43-47 " > "'s should be " < "'s and " < "'s should be " > "'s.

Signed and Sealed this

Eighth Day of November 1977

[SEAL]

Attest:

RUTH C. MASON
Attesting Officer

LUTRELLE F. PARKER
Acting Commissioner of Patents and Trademarks